US012641530B2

(12) United States Patent
Speicher et al.

(10) Patent No.: US 12,641,530 B2
(45) Date of Patent: May 26, 2026

(54) STANDALONE NON-PUBLIC NETWORK ACCESS

(71) Applicant: QUALCOMM Incorporated, San Diego, CA (US)

(72) Inventors: Sebastian Speicher, Wallisellen (CH); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/948,333

(22) Filed: Sep. 14, 2020

(65) Prior Publication Data

US 2021/0105712 A1 Apr. 8, 2021

Related U.S. Application Data

(60) Provisional application No. 62/910,911, filed on Oct. 4, 2019.

(51) Int. Cl.
H04W 48/18 (2009.01)
H04W 48/08 (2009.01)
(Continued)

(52) U.S. Cl.
CPC ........... H04W 48/18 (2013.01); H04W 48/08 (2013.01); H04W 60/04 (2013.01); H04W 84/105 (2013.01); H04W 88/02 (2013.01)

(58) Field of Classification Search
CPC ..... H04W 48/18; H04W 48/08; H04W 60/04; H04W 84/105; H04W 88/02
See application file for complete search history.

(56) References Cited

U.S. PATENT DOCUMENTS 10,028,215 B2 * 7/2018 Kim ...................... H04W 72/56
10,136,318 B1 11/2018 Hancock et al.
(Continued)

FOREIGN PATENT DOCUMENTS

CN 109618390 A 4/2019
CN 110213808 A 9/2019
WO WO-2020204536 A1 10/2020

OTHER PUBLICATIONS

"3rd Generation Partnership Project, Technical Specification Group Services and System Aspects, Study on Audio-Visual Service Production Stage 1 (Release 17)", ' 3GPP Draft, S1 192676 was S1-192203_Revisionmarks, 3rd Generation Partnership Project (3GPP), Mobile Competence Centre, 650, Route Des Lucioles, F-06921 Sophia-Antipolis Cedex, France, vol. SA WG1 Aug. 24, 2019 (Aug. 24, 2019), XP051776171, (3GPP TR 22.287, V1.1.0; May 2019) Retrieved from the Internet : URL:http://www.3gpp.org/ftp/tsg_sa/WG1_Serv/TSGS1_87_SophiaAntipolis/Docs/S1-192676.zip [retrieved on Aug. 24, 2019] paragraphs 5.2.5, 5.9.5 and 5.12.1 to 5.12 .6.
(Continued)

*Primary Examiner* — Steven S Kelley
(74) *Attorney, Agent, or Firm* — Harrity & Harrity, LLP

(57) ABSTRACT

Various aspects of the present disclosure generally relate to wireless communication. In some aspects, a user equipment (UE) may determine whether a standalone non-public network (SNPN), to which the UE is not subscribed, permits access to subscribers of a network to which the UE is subscribed. The UE may register with the SNPN based at least in part on a determination that the SNPN permits access to subscribers of the network to which the UE is subscribed. Numerous other aspects are provided.

30 Claims, 9 Drawing Sheets

500 ➔

510 ➔ Determine whether an SNPN, to which a UE is not subscribed, permits access to subscribers of a network to which the UE is subscribed 520 ➔ Register with the SNPN based at least in part on a determination that the SNPN permits access to subscribers of the network to which the UE is subscribed

(51) Int. Cl.

| | |
|---|---|
| *H04W 60/04* | (2009.01) |
| *H04W 84/10* | (2009.01) |
| *H04W 88/02* | (2009.01) |

(56) References Cited

U.S. PATENT DOCUMENTS

| | | | | |
|---|---|---|---|---|
| 11,356,931 | B2 * | 6/2022 | Targali | H04W 12/06 |
| 11,451,950 | B2 * | 9/2022 | Li | H04W 8/12 |
| 2006/0035662 | A1 * | 2/2006 | Jeong | H04W 48/06 |
| | | | | 455/115.3 |
| 2016/0135116 | A1 * | 5/2016 | Chen | H04W 48/14 |
| | | | | 455/450 |
| 2019/0191470 | A1 | 6/2019 | Joseph et al. | |
| 2020/0245235 | A1 * | 7/2020 | Chun | H04W 48/18 |
| 2021/0051577 | A1 * | 2/2021 | Won | H04W 48/16 |
| 2021/0099869 | A1 * | 4/2021 | Palanigounder | H04W 8/26 |
| 2021/0099924 | A1 * | 4/2021 | Shih | H04W 48/18 |
| 2021/0099968 | A1 * | 4/2021 | Tiwari | H04W 60/005 |
| 2021/0100062 | A1 * | 4/2021 | Joseph | H04W 76/27 |
| 2021/0219226 | A1 * | 7/2021 | Liao | H04W 76/11 |
| 2021/0297937 | A1 * | 9/2021 | Baek | H04W 48/12 |
| 2022/0038898 | A1 * | 2/2022 | Stojanovski | H04W 60/04 |
| 2022/0272612 | A1 * | 8/2022 | Ingale | H04W 48/12 |
| 2022/0369219 | A1 * | 11/2022 | Landais | H04W 72/0453 |
| 2023/0015696 | A1 * | 1/2023 | Speicher | H04W 8/186 |

OTHER PUBLICATIONS

Ericsson: "Submission for Information on Commonalities in Solutions for Non-Public Network", 3GPP Draft, 3GPP TSG-RAN WG2 #106, R2-1907313, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, May 13, 2019-May 17, 2019 May 13, 2019 (May 13, 2019), XP051730752, 11 Pages, Retrieved from the Internet: URL:http://www.3gpp.org/ftp/Meetings%5F3GPP%5FSYNC/RAN2/Docs/R2%2D1907313%2Ezip [retrieved on May 13, 2019] paragraphs 2.1 to 2.3.

International Search Report and Written Opinion—PCT/US2020/050880—ISA/EPO—Nov. 26, 2020.

Samsung: "Discussion on Private Network Support for NG-RAN", 3GPP Draft, 3GPP TSG-RAN WG2 Meeting #107, R2-1911312 Discussion on NPN, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019 Aug. 16, 2019 (Aug. 16, 2019), XP051769069, 4 Pages, Retrieved from the Internet : URL:http://www.3gpp.org/ftp/tsg_ran/WG2_RL2/TSGR2_107/Docs/R2-1911312.zip [retrieved on Aug. 16, 2019] paragraphs 3 and 4.

Tencent: "CR to TS 23.501 on Identification, Network Selection and Unified Access Control for NPN", 3GPP Draft, 3GPP TSG-SA WG2 Meeting #130, S2-1900157_CR to TS 23.501 on Identification, Network Selection and Unified Access Control for NPN , 3rd Generation Partnership Project (3GPP), Mobile Competence Centre, 650, Route Des LUC, vol. SA WG2, No. Kochi, India, Jan. 21, 2019-Jan. 25, 2019 Jan. 15, 2019 (Jan. 15, 2019), XP051596800, 4 Pages, Retrieved from the Internet: URL:http://www.3gpp.org/ftp/Meetings%5F3GPP%5FSYNC/SA2/Docs/S2%2D1900157%2Ezip [retrieved on Jan. 15, 2019] paragraphs 5.2.2 and 5.2.4.

3GPP TR 22.827: "3rd Generation Partnership Project, Technical Specification Group Services and System Aspects, Study on Audio-Visual Service Production Stage 1 (Release 17)", 3GPP TR 22.827, V1.1.0, May 2019, 73 Pages.

European Search Report EP25178615 Search Authority Munich Sep. 18, 2025.

* cited by examiner

500

510 Determine whether an SNPN, to which a UE is not subscribed, permits access to subscribers of a network to which the UE is subscribed 520 Register with the SNPN based at least in part on a determination that the SNPN permits access to subscribers of the network to which the UE is subscribed

STANDALONE NON-PUBLIC NETWORK ACCESS

CROSS-REFERENCE TO RELATED APPLICATION

This Patent Application claims priority to U.S. Provisional Patent Application No. 62/910,911, filed on Oct. 4, 2019, entitled "STANDALONE NON-PUBLIC NETWORK ACCESS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for standalone non-public network access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether a standalone non-public network (SNPN), to which the UE is not subscribed, permits access to subscribers of a network to which the UE is subscribed; and registering with the SNPN based at least in part on a determination that the SNPN permits access to subscribers of the network to which the UE is subscribed.

In some aspects, a UE for wireless communication may include memory and one or more processors operatively coupled to the memory. The memory and the one or more processors may be configured to determine whether an SNPN, to which the UE is not subscribed, permits access to subscribers of a network to which the UE is subscribed; and register with the SNPN based at least in part on a determination that the SNPN permits access to subscribers of the network to which the UE is subscribed.

In some aspects, a non-transitory computer-readable medium may store one or more instructions for wireless communication. The one or more instructions, when executed by one or more processors of a UE, may cause the one or more processors to: determine whether an SNPN, to which the UE is not subscribed, permits access to subscribers of a network to which the UE is subscribed; and register with the SNPN based at least in part on a determination that the SNPN permits access to subscribers of the network to which the UE is subscribed.

In some aspects, an apparatus for wireless communication may include means for determining whether an SNPN, to which the UE is not subscribed, permits access to subscribers of a network to which the UE is subscribed; and means for registering with the SNPN based at least in part on a determination that the SNPN permits access to subscribers of the network to which the UE is subscribed.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
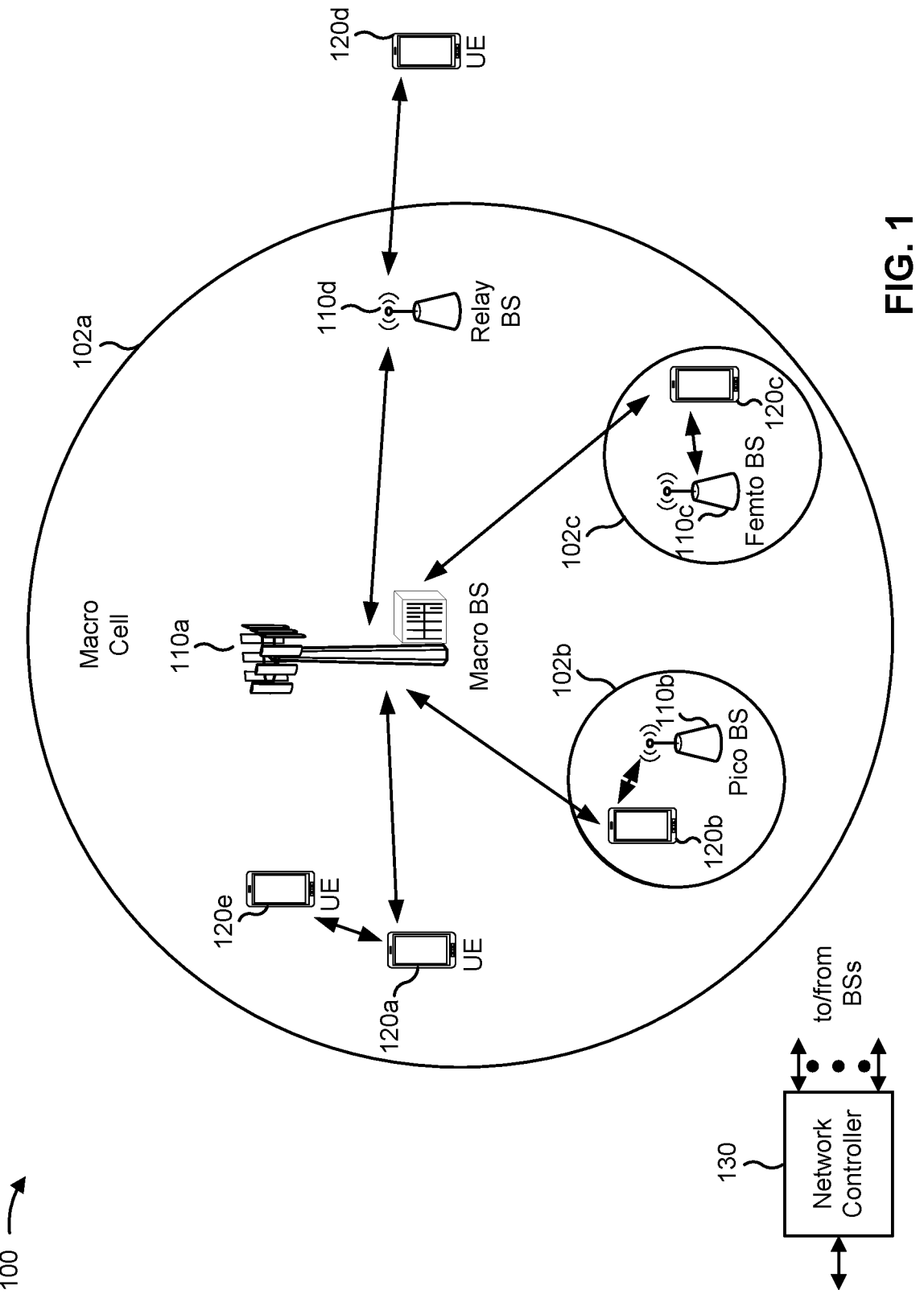
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE

120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
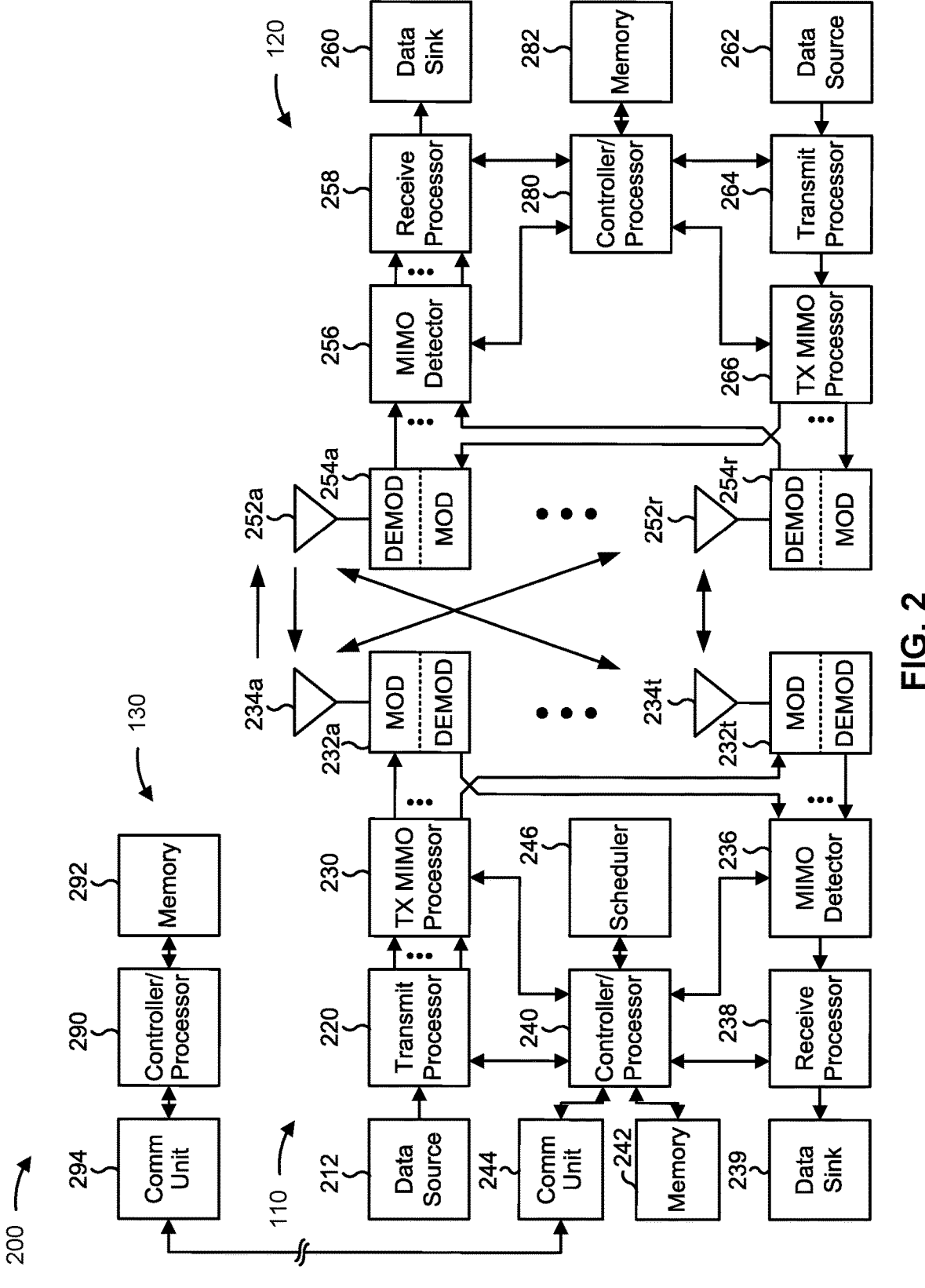
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with standalone non-public network (SNPN) access, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for determining whether an SNPN, to which the UE 120 is not subscribed, permits access to subscribers of a network to which the UE 120 is subscribed, means for registering with the SNPN based at least in part on a determination that the SNPN permits access to subscribers of the network to which the UE is subscribed, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

An SNPN is a dedicated, private wireless network (e.g., a 5G network) that may be associated with an enterprise, a facility, and/or a site. For example, an SNPN may be associated with a particular corporate campus, a particular factory, a particular industrial facility, and/or the like. Access to an SNPN may be limited to UEs having subscriptions to the SNPN. However, a UE that is not subscribed to the SNPN may lack information on the SNPN, such as information indicating whether the SNPN is a public or a non-public network, whether the SNPN permits access to subscribers of other networks, and/or the like. Accordingly, the UE, when in the SNPN's coverage area, may attempt to register with the SNPN even if the UE will not be permitted access, thereby consuming computing resources, network resources, and/or the like.

Some techniques and apparatuses described herein enable a UE to determine whether the UE may access an SNPN using a subscription for another network. For example, the UE may determine whether the UE may access an SNPN using a subscription for another network prior to attempting registration with the SNPN. In this way, the UE and/or the SNPN may conserve computing resources, network resources, and/or the like, that may otherwise be used in a registration attempt that will not be permitted.

Figure 3A:
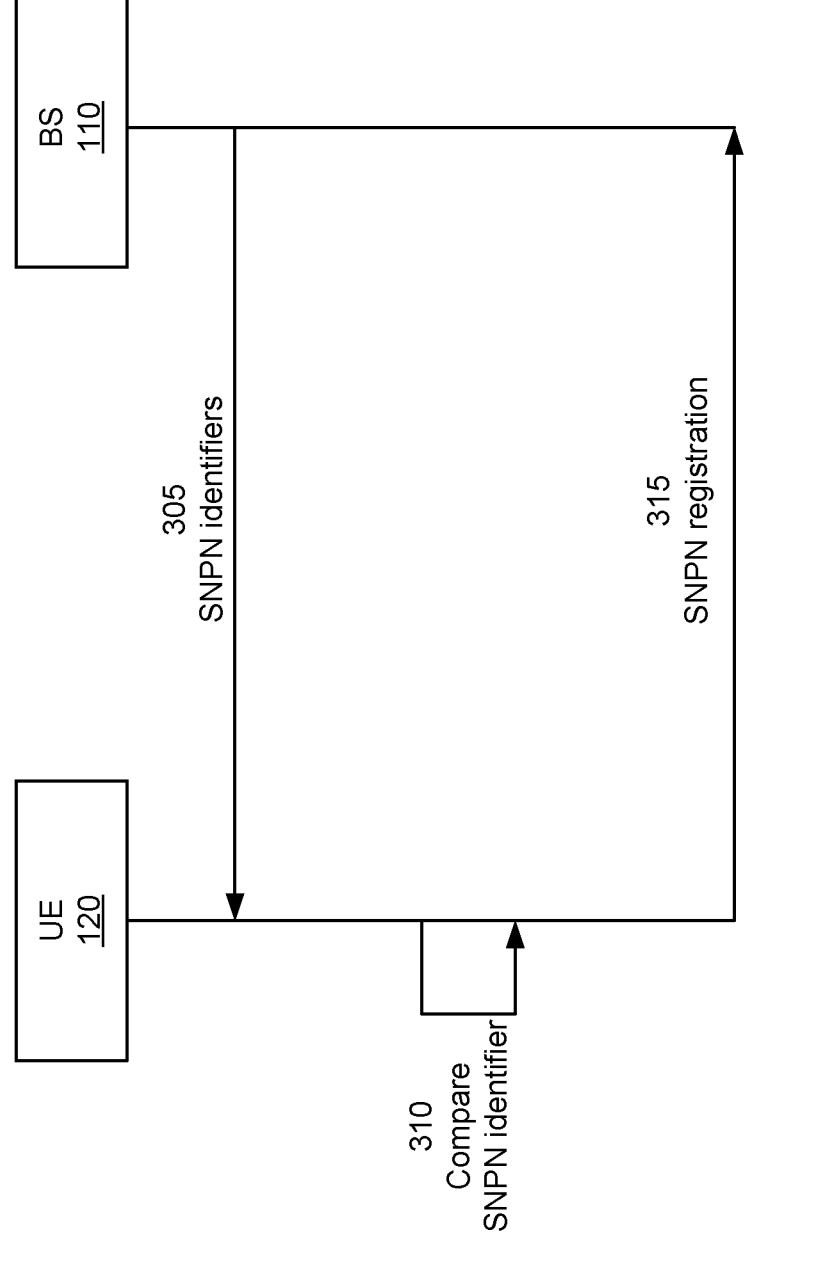
FIGS. 3A-3C are diagrams illustrating examples of standalone non-public network access, in accordance with various aspects of the present disclosure.
Figure 3B:
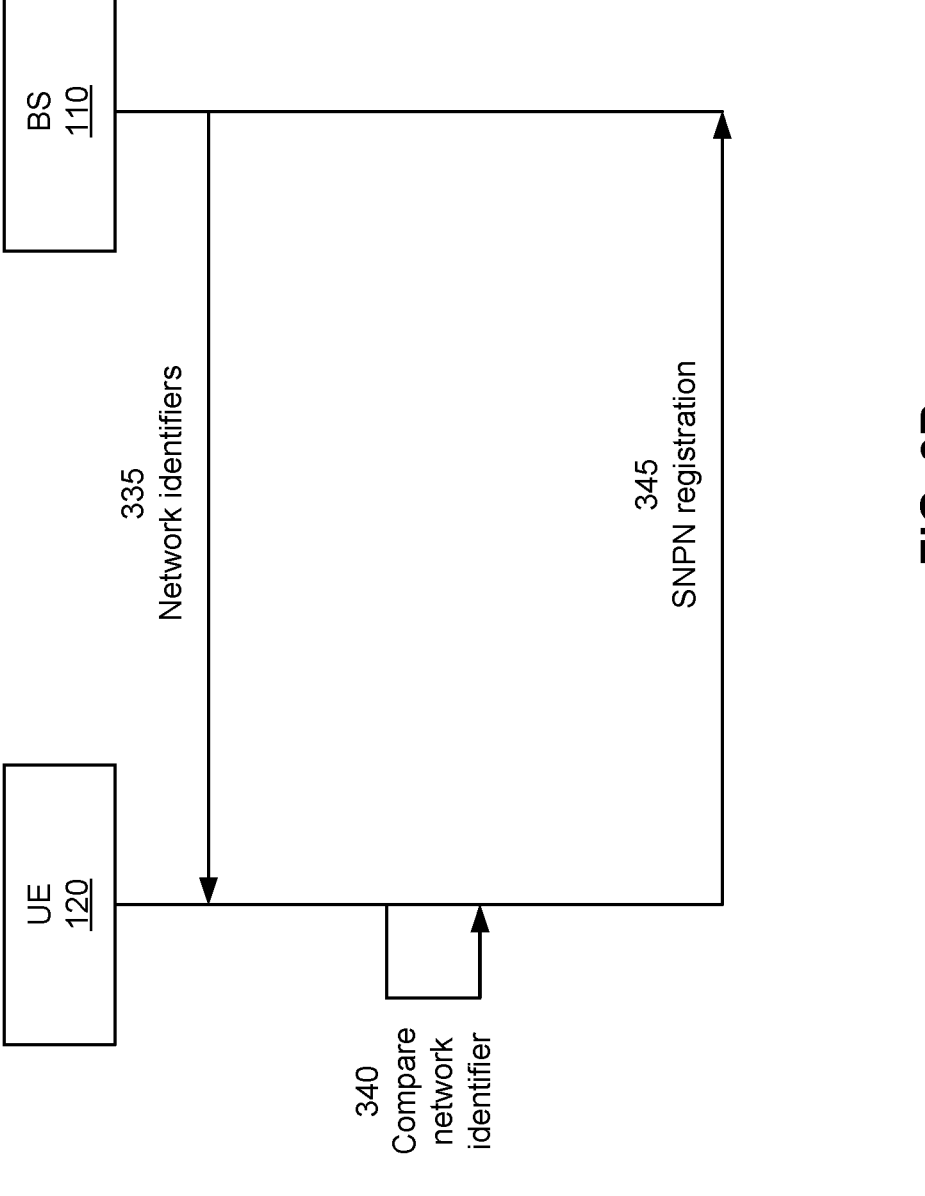
Figure 3C:
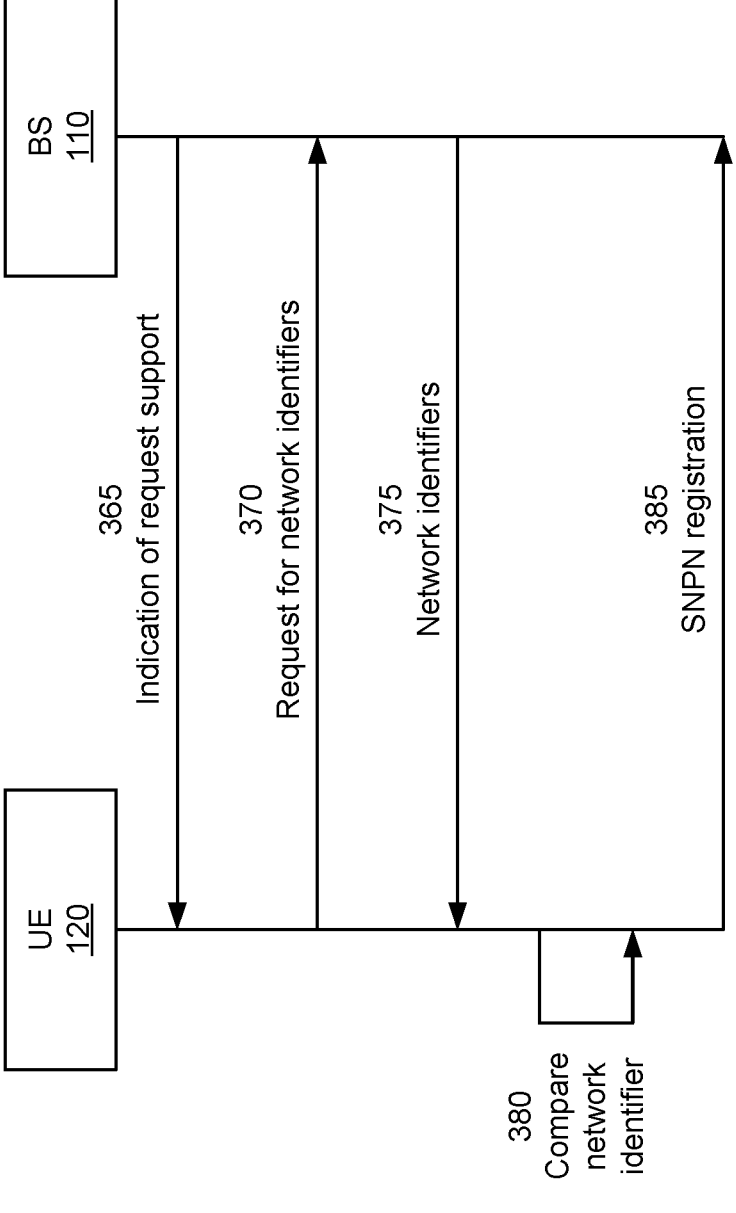

FIGS. 3A-3C are diagrams illustrating examples 300, 330, and 360 of SNPN access, in accordance with various aspects of the present disclosure. As shown in FIGS. 3A-3C, a UE 120 may communicate with a BS 110 in connection with accessing an SNPN. The BS 110 may be associated with a radio access network of one or more SNPNs. In some aspects, the UE 120 may not be subscribed to the one or more SNPNs, and thus, each of the one or more SNPNs may be referred to as a visited-SNPN (V-SNPN) relative to the UE 120. In addition, an SNPN may be associated with an identifier, such as an identifier formed from a combination of a public land mobile network (PLMN) identifier and a network identifier.

In some aspects, the UE 120 may be subscribed to one or more other wireless networks (e.g., one or more PLMNs, one or more other SNPNs, and/or the like), and thus, each of the one or more other wireless networks may be referred to as a home service provider (SP) relative to the UE 120. A wireless network (e.g., a home SP) may be associated with an identifier, such as a PLMN identifier (in the case of a PLMN), an identifier formed from a combination of a PLMN identifier and a network identifier (in the case of an SNPN), and/or a domain name (in the case of an SNPN).

In some aspects, the UE 120 may determine whether an SNPN (e.g., a V-SNPN), to which the UE is not subscribed, permits access to subscribers of a network (e.g., a home SP) to which the UE is subscribed, according to one or more procedures. Example 300 of FIG. 3A shows a UE configuration-based procedure for determining whether an SNPN permits access to subscribers of another network. Example 330 of FIG. 3B shows a network broadcast-based procedure for determining whether an SNPN permits access to subscribers of another network. Example 360 of FIG. 3C shows a UE request-based procedure for determining whether an SNPN permits access to subscribers of another network. In some aspects, the UE 120 may be operating in an SNPN-access mode in order to enable discovery of SNPNs. In some aspects, the BS 110 may transmit (e.g., broadcast) an indication (e.g., a single-bit indication) of whether an SNPN associated with the BS 110 permits access to subscribers of other wireless networks.

As shown in FIG. 3A, and by reference number 305, the BS 110 may transmit, and the UE 120 may receive, a communication that includes an SNPN identifier (e.g., a combination of a PLMN identifier and a network identifier) for an SNPN (e.g., a V-SNPN) associated with the BS 110. In some aspects, the communication may be a broadcast communication. For example, the communication may be included in a system information block (SIB) transmitted by the BS 110. In some aspects, the communication may include multiple SNPN identifiers corresponding, respectively, to multiple SNPNs associated with the BS 110.

As shown by reference number 310, the UE 120 may compare the received SNPN identifier to a set (e.g., one or more) of SNPN identifiers stored by the UE 120. In some aspects, the UE 120 may have a configuration for the set of SNPN identifiers. The configuration may identify a priority order for the set of SNPN identifiers. In addition, the configuration may be associated with a subscription of the UE 120 to a wireless network (e.g., a home SP). Accordingly, the set of SNPN identifiers may correspond to respective SNPNs (e.g., V-SNPNs) that permit access to subscribers of the subscribed wireless network. In some aspects, the UE 120 may have multiple configurations (e.g., for respective subscriptions of the UE 120) that include respective sets of SNPN identifiers, and the UE 120 may compare the received SNPN identifier to each set of SNPN identifiers.

In some aspects, the UE 120 may receive a configuration from a wireless network (e.g., a home SP) to which the UE 120 is subscribed. For example, the UE 120 may receive a configuration from a base station of the wireless network, such as via non-access stratum (NAS) messaging. The UE 120 may receive the configuration upon subscribing to the wireless network, or periodically, such as when updates to the set of SNPN identifiers occur. In some other aspects, a subscriber identity module (SIM) card or a universal integrated circuit card (UICC) coupled to the UE 120 may include a configuration.

In some aspects, the UE 120 may compare the received SNPN identifier to a set of SNPN identifiers stored by the UE 120 in order to determine whether the SNPN (associated with the SNPN identifier), to which the UE 120 is not subscribed, permits access to subscribers of a wireless network to which the UE 120 is subscribed. For example, if the received SNPN identifier corresponds to an SNPN identifier in the set of SNPN identifiers (associated with a subscription of the UE 120), the UE 120 may determine that the SNPN (associated with the SNPN identifier) permits access to subscribers of the subscribed wireless network (e.g., a home SP). Accordingly, the UE 120 may determine that a subscription of the UE 120 for the subscribed wireless network may be used to access the SNPN (e.g., a V-SNPN), and may select the subscription and the SNPN for registration. In some cases, the received SNPN identifier may correspond to SNPN identifiers in different sets of SNPN identifiers (associated with different subscriptions of the UE 120). In such a case, the UE 120 may select one subscription for registration.

In some aspects, such as when the UE 120 receives a plurality of SNPN identifiers from the BS 110, the UE 120 may determine that multiple received SNPN identifiers correspond to multiple SNPN identifiers in a set of SNPN identifiers stored by the UE 120. Accordingly, the UE 120 may determine that multiple SNPNs (associated with the multiple SNPN identifiers) permit access to subscribers of a wireless network (e.g., a home SP) to which the UE 120 is subscribed. In such a case, the UE 120 may determine that a subscription of the UE 120 for the subscribed wireless network may be used to access the multiple SNPNs (e.g., V-SNPNs), and may select the subscription and one SNPN from the multiple SNPNs for registration. For example, the UE 120 may select the SNPN according to a priority order of the set of SNPN identifiers (e.g., select an SNPN associated with an SNPN identifier having a highest priority among the set of SNPN identifiers).

In some other aspects, such as when the UE 120 receives a plurality of SNPN identifiers from the BS 110, the UE 120 may determine that multiple received SNPN identifiers correspond to SNPN identifiers in different sets of SNPN identifiers (associated with different subscriptions of the UE 120) stored by the UE 120. Accordingly, the UE 120 may determine that multiple subscriptions of the UE 120 may be used, respectively, to access the multiple SNPNs (e.g., V-SNPNs), and may select one subscription and corresponding SNPN for registration.

As shown by reference number 315, the UE 120 may perform a registration procedure with the SNPN (e.g., the selected SNPN) based at least in part on a determination that the SNPN permits access to subscribers of a subscribed wireless network of the UE 120. For example, the UE 120 may perform the registration procedure based at least in part on a determination that a subscription (e.g., a selected subscription) of the UE 120 for a wireless network may be used to access the SNPN. Accordingly, the UE 120 may transmit, and the BS 110 may receive, a registration request. In some aspects, the registration request may identify an SNPN identifier of the selected SNPN. In addition, the registration request may include a subscription permanent identifier (SUPI) of the UE 120 for the subscribed wireless network and/or other credentials of the UE 120 relating to a subscription for the wireless network. In some aspects, the SUPI may be in a concealed form, such as a subscription concealed identifier (SUCI). Based on receiving the registration request, the BS 110 may cause communication between the SNPN (e.g., V-SNPN) and the subscribed wireless network (e.g., home SP) to effect registration of the UE 120 on the SNPN.

As shown in FIG. 3B, and by reference number 335, the BS 110 may transmit, and the UE 120 may receive, a communication that includes a set (e.g., one or more) of network identifiers corresponding to respective wireless networks (e.g., home SPs) of which subscribers are permitted to access an SNPN (e.g., a V-SNPN) associated with the BS 110. A network identifier may be a PLMN identifier (in a case when the wireless network is a PLMN), a combination of a PLMN identifier and network identifier (in a case when the wireless network is an SNPN), and/or a domain name (in a case when the wireless network is an SNPN). In some aspects, a network identifier may be a shortened network identifier that corresponds to a full network identifier for a wireless network. For example, the network identifier may be a hash value of the full network identifier.

In some aspects, the communication (or multiple communications) may include multiple sets of network identifiers corresponding, respectively, to multiple SNPNs associated with the BS 110 (e.g., when a cell is shared by multiple SNPNs). In some aspects, the communication may be a broadcast communication. For example, the communication may be included in a SIB transmitted by the BS 110.

As shown by reference number 340, the UE 120 may compare the received set of network identifiers to a stored network identifier associated with a wireless network (e.g., a home SP) to which the UE 120 is subscribed. For example, the UE 120 may be configured with a SUPI for the subscribed wireless network. In some aspects, the UE 120 may compare the received set of network identifiers to a portion of the SUPI that identifies a wireless network (e.g., a PLMN identifier portion of the SUPI, a PLMN identifier and network identifier portion of the SUPI, and/or a domain name portion of the SUPI). In some aspects, the UE 120 may be subscribed to multiple wireless networks (e.g., multiple home SPs), and may be configured with respective network identifiers (e.g., SUPIs) for the multiple subscribed wireless networks. In such cases, the UE 120 may compare the received set of network identifiers to the network identifier for each wireless network subscription of the UE 120.

In some aspects, such as when the set of network identifiers is a set of shortened network identifiers, the UE 120 may process (e.g., using a mapping) a network identifier (e.g., a portion of a SUPI) associated with a subscribed wireless network in order to determine a shortened network identifier. For example, the UE 120 may process the network identifier with a hash function in order to determine a shortened network identifier. The UE 120 may then compare the set of shortened network identifiers to the determined shortened network identifier, as described above.

In some aspects, the UE 120 may compare the received set of network identifiers to a network identifier associated with a wireless network to which the UE 120 is subscribed in order to determine whether the SNPN (associated with the set of network identifiers), to which the UE 120 is not subscribed, permits access to subscribers of a wireless network to which the UE 120 is subscribed. For example, if a network identifier associated with a subscribed wireless network (e.g., a home SP) corresponds to a network identifier in a set of network identifiers received by the UE 120, the UE 120 may determine that the SNPN (associated with the set of network identifiers) permits access to subscribers of the subscribed wireless network. Accordingly, the UE 120 may determine that a subscription of the UE 120 for the subscribed wireless network may be used to access the SNPN (e.g., a V-SNPN), and may select the subscription and the SNPN for registration.

In some aspects, such as when the UE 120 receives a plurality of sets of network identifiers from the BS 110, the UE 120 may determine that a network identifier, associated with a subscription of the UE 120, corresponds to network identifiers in different received sets of network identifiers. Accordingly, the UE 120 may determine that multiple SNPNs (associated with the different sets of network identifiers) permit access to subscribers of a wireless network (e.g., a home SP) to which the UE 120 is subscribed. Accordingly, the UE 120 may determine that a subscription of the UE 120 for the subscribed wireless network may be used to access the multiple SNPNs (e.g., V-SNPNs), and may select the subscription, and one SNPN from the multiple SNPNs, for registration.

In some other aspects, such as when the UE 120 receives a plurality of sets of network identifiers from the BS 110, the UE 120 may determine that multiple network identifiers, associated with multiple subscriptions of the UE 120, correspond to network identifiers in different received sets of network identifiers. Accordingly, the UE 120 may determine that multiple SNPNs (associated with the different sets of network identifiers) permit access to subscribers of more than one wireless network (e.g., home SPs) to which the UE 120 is subscribed. Accordingly, the UE 120 may determine that multiple subscriptions of the UE 120 for the subscribed wireless networks may be used, respectively, to access the multiple SNPNs (e.g., V-SNPNs), and may select one subscription and corresponding SNPN for registration.

As shown by reference number 345, the UE 120 may perform a registration procedure with the SNPN (e.g., the selected SNPN) based at least in part on a determination that the SNPN permits access to subscribers of a subscribed wireless network, as described above in connection with FIG. 3A.

As shown in FIG. 3C, and by reference number 365, the BS 110 may transmit, and the UE 120 may receive, a communication indicating support for requests to receive access information from an SNPN (e.g., a V-SNPN) associated with the BS 110. In some aspects, the communication (or multiple communications) may indicate support for requests to receive access information from multiple SNPNs associated with the BS 110 (e.g., when a cell is shared by multiple SNPNs). In such a case, the communication may include respective SNPN identifiers of the multiple SNPNs that support requests. In some aspects, the communication may be a broadcast communication. For example, the communication may be included in a SIB transmitted by the BS 110.

As shown by reference number 370, the UE 120 may transmit, and the BS 110 may receive, a communication that includes a request to receive access information from the SNPN. For example, the UE 120 may transmit the request based at least in part on receiving the communication indicating support for requests to receive access information from the SNPN. In some aspects, the request may include an SNPN identifier of an SNPN from which the UE 120 is requesting to receive access information. The requested access information may relate to a set of network identifiers corresponding to respective wireless networks (e.g., home SPs) of which subscribers are permitted to access the SNPN.

As shown by reference number 375, the BS 110 may transmit, and the UE 120 may receive, a communication that includes a set (e.g., one or more) of network identifiers corresponding to respective wireless networks (e.g., home SPs) of which subscribers are permitted to access the SNPN (e.g., V-SNPN). That is, the BS 110 may transmit the communication as a response to the request to receive access information transmitted by the UE. In some aspects, such as when the UE 120 requests to receive access information from multiple SNPNs, the communication (or multiple communications) may identify multiple sets of network identifiers.

In some aspects, the request (transmitted by the UE 120) and the response (transmitted by the BS 110) may be NAS messages (e.g., unauthenticated or authenticated NAS messages). Additionally, or alternatively, the request (transmitted by the UE 120) and the response (transmitted by the BS 110) may be radio resource control (RRC) messages. Additionally, or alternatively, the request (transmitted by the UE 120) may be a system information request message and the response (transmitted by the BS 110) may be an on-demand SIB message. In some aspects, the request may be one of a NAS message, RRC message, or system information request message, and the response may be another of a NAS message, RRC message, or on-demand SIB message.

As shown by reference number 380, the UE 120 may compare the received set of network identifiers to a network identifier associated with a wireless network to which the UE 120 is subscribed, as described above in connection with FIG. 3B. For example, the UE 120 may compare the received set of network identifiers to a network identifier associated with a wireless network to which the UE 120 is subscribed in order to determine whether the SNPN (associated with the set of network identifiers), to which the UE 120 is not subscribed, permits access to subscribers of a wireless network to which the UE 120 is subscribed.

As shown by reference number 385, the UE 120 may perform a registration procedure with the SNPN based at least in part on a determination that the SNPN permits access to subscribers of a subscribed wireless network, as described above in connection with FIG. 3A.

As indicated above, FIGS. 3A-3C are provided as examples. Other examples may differ from what is described with respect to FIGS. 3A-3C.

Figure 4A:
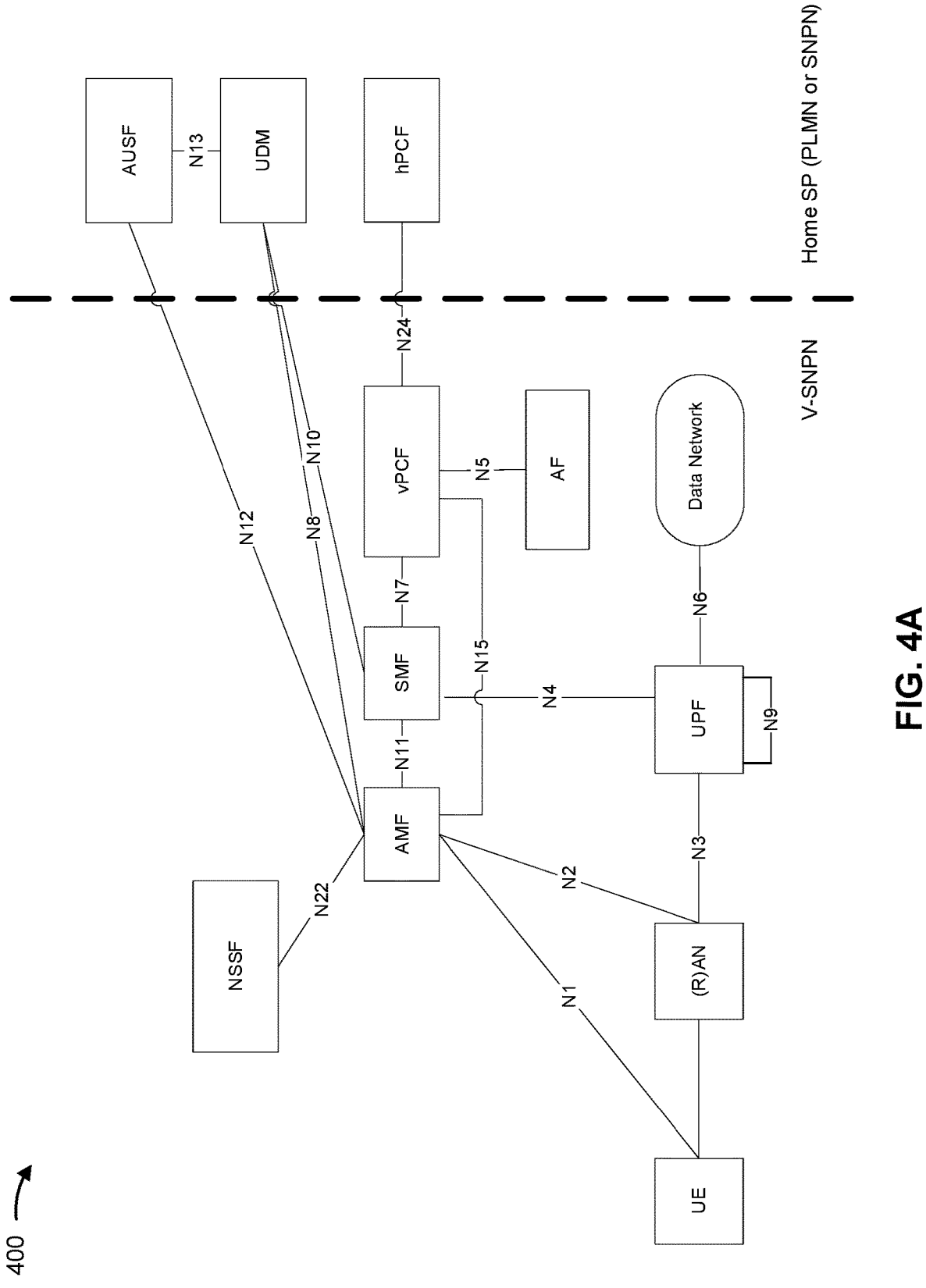
FIGS. 4A-4C are diagrams illustrating examples of standalone non-public network access, in accordance with various aspects of the present disclosure.
Figure 4B:
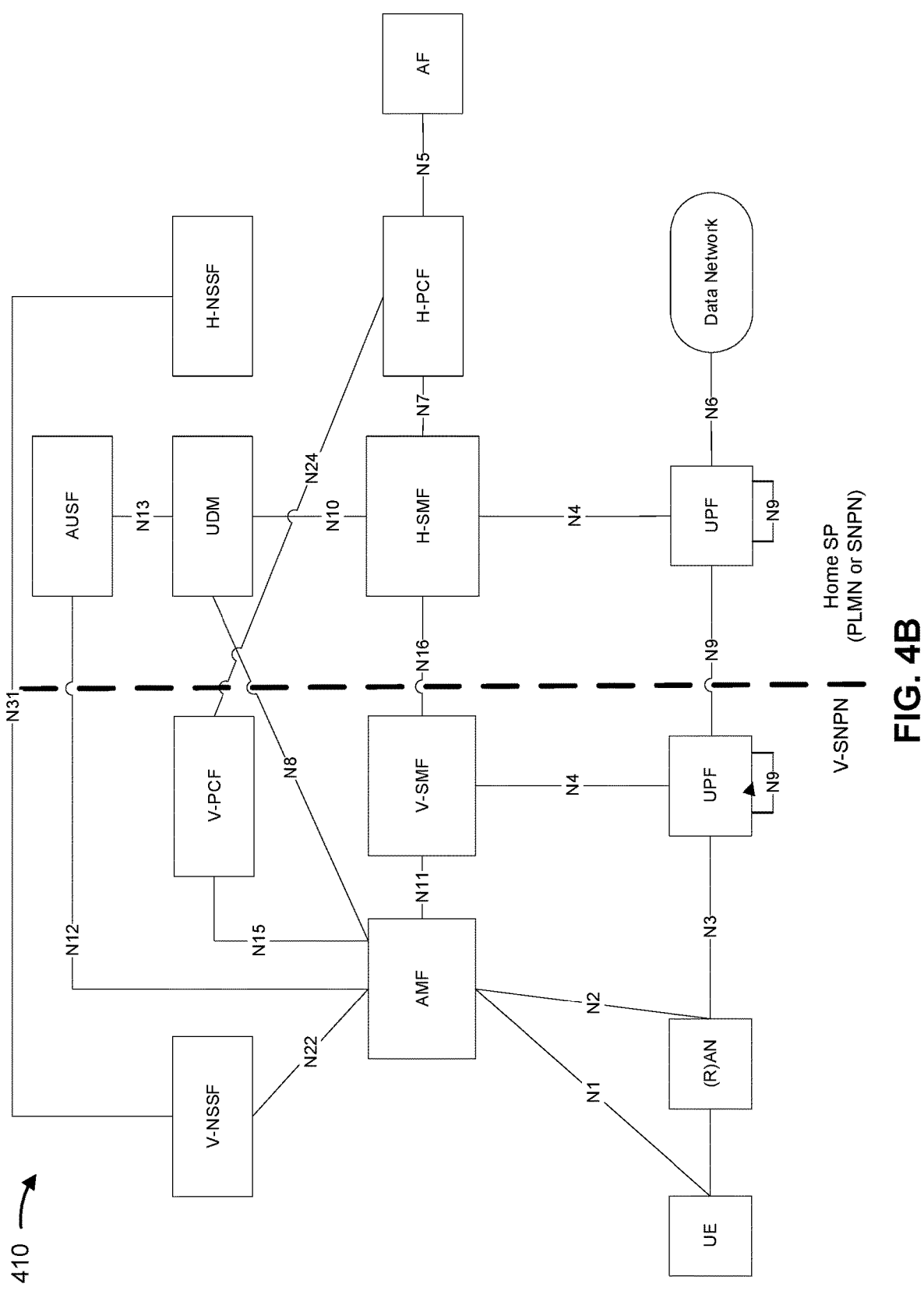
Figure 4C:
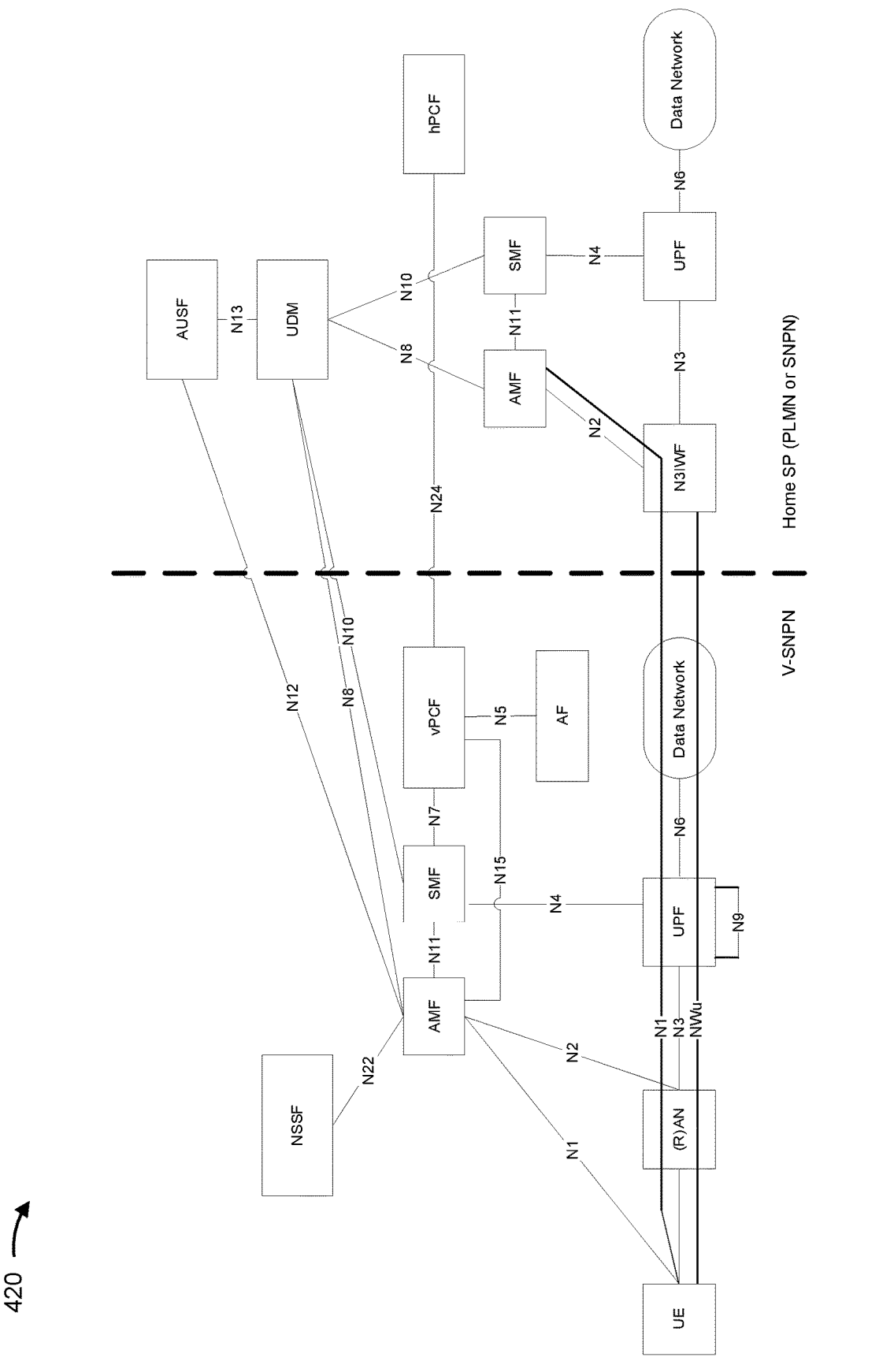

FIGS. 4A-4C are diagrams illustrating examples 400, 410, and 420 of SNPN access, in accordance with various aspects of the present disclosure. In particular, FIGS. 4A-4C show communications between components (e.g., implementing various network functions) of a subscribed wireless network (e.g., a home SP) and an SNPN (e.g., a V-SNPN) in connection with a registration procedure of a UE (e.g., UE 120). Accordingly, as part of the registration procedure of the UE, the SNPN (e.g., one or more devices and/or components implementing the SNPN) may establish a connection to the subscribed wireless network (e.g., one or more devices and/or components implementing the subscribed wireless network). For example, based at least in part on an identifier provided by the UE as part of a registration procedure (e.g., a SUPI, a SUCI, and/or the like), as described above, a device implementing one or more components of the SNPN may determine an identity of the subscribed wireless network and, accordingly, may determine an address (e.g., using a mapping) at which the subscribed wireless network is reachable.

As shown in FIG. 4A, the SNPN may communicate with the subscribed wireless network to perform authentication of the UE and obtain subscription information for the UE. In particular, an access and mobility management function (AMF) of the SNPN may communicate with an authentication server function (AUSF) of the subscribed wireless network to authenticate the UE. For example, the AMF may transmit credentials of the UE that were provided with a registration request of the UE, as described above in connection with FIG. 3A. In addition, the AMF and a session management function (SMF) of the SNPN may communicate with a unified data management (UDM) function of the subscribed wireless network to obtain subscription information for the UE. For example, the AMF and/or the SMF may transmit an identifier of the UE (e.g., a SUPI or a SUCI) that was provided with a registration request of the UE, as described above in connection with FIG. 3A. As shown in FIG. 4A, after registration, the UE may communicate with a data network (e.g., a data network providing non-public network services, and/or the like) via a user plane function (UPF) of the SNPN.

As shown in FIG. 4B, the SNPN may communicate with the subscribed wireless network to perform authentication of the UE and obtain subscription information for the UE, as described above. In particular, an AMF of the SNPN may communicate with an AUSF of the subscribed wireless network to authenticate the UE, as described above. In addition, the AMF may communicate with a UDM component of the subscribed wireless network to obtain subscription information for the UE, as described above. As shown in FIG. 4B, after registration, the UE may communicate with a data network (e.g., the Internet) via the subscribed wireless network. For example, a UPF of the SNPN may forward a session (e.g., a physical data unit (PDU) session) of the UE to a UPF of the subscribed wireless network for termination at the data network via the subscribed wireless network.

As shown in FIG. 4C, the SNPN may communicate with the subscribed wireless network to perform authentication of the UE and obtain subscription information for the UE, as described above. In particular, an AMF of the SNPN may communicate with an AUSF of the subscribed wireless network to authenticate the UE, as described above. In addition, the AMF and an SMF of the SNPN may communicate with a UDM component of the subscribed wireless network to obtain subscription information for the UE, as described above. As shown in FIG. 4C, after registration, the UE may communicate with a data network (e.g., the Internet) via a UPF of the SNPN. As further shown in FIG. 4C, the UE may establish a tunnel, via the data network, to an inter-working function (IWF, shown as N3IWF) of the subscribed wireless network, thereby enabling the UE to access a data network (e.g., for file retrieval) via the UPF of the subscribed wireless network.

As indicated above, FIGS. 4A-4C are provided as examples. Other examples may differ from what is described with respect to FIGS. 4A-4C.

Figure 5:
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with SNPN access.

As shown in FIG. 5, in some aspects, process 500 may include determining whether an SNPN, to which a UE is not subscribed, permits access to subscribers of a network to which the UE is subscribed (block 510). For example, the UE (e.g., using antenna 252, DEMOD 254, MIMO detector 256, receive processor 258, controller/processor 280, and/or the like) may determine whether an SNPN, to which the UE is not subscribed, permits access to subscribers of a network to which the UE is subscribed, as described above.

As further shown in FIG. 5, in some aspects, process 500 may include registering with the SNPN based at least in part on a determination that the SNPN permits access to subscribers of the network to which the UE is subscribed (block 520). For example, the UE (e.g., using controller/processor 280, transmit processor 264, TX MIMO processor 266, MOD 254, antenna 252, and/or the like) may register with the SNPN based at least in part on a determination that the SNPN permits access to subscribers of the network, as described above.

Process 500 may include additional aspects, such as any single aspect or any combination of aspects described below and/or in connection with one or more other processes described elsewhere herein.

In a first aspect, determining whether the SNPN permits access to subscribers of the network includes receiving a communication that includes an SNPN identifier, and comparing the SNPN identifier to a set of SNPN identifiers corresponding to respective SNPNs that permit access to subscribers of the network. In a second aspect, alone or in combination with the first aspect, process 500 further includes receiving, from a base station of the network, a configuration for the set of SNPN identifiers prior to determining whether the SNPN permits access to subscribers of the network.

In a third aspect, alone or in combination with one or more of the first and second aspects, determining whether the SNPN permits access to subscribers of the network includes receiving a communication that includes one or more network identifiers corresponding to respective networks of which subscribers are permitted access to the SNPN, and comparing an identifier of the network to the one or more network identifiers. In a fourth aspect, alone or in combination with one or more of the first through third aspects, the one or more network identifiers are shortened network identifiers that correspond to full network identifiers of the respective networks, and the identifier of the network is a shortened identifier that corresponds to a full network identifier of the network. In a fifth aspect, alone or in combination with one or more of the first through fourth aspects, the communication is a broadcast communication.

In a sixth aspect, alone or in combination with one or more of the first through fifth aspects, process 500 further includes transmitting a request to receive the one or more network identifiers, where the communication that includes the one or more network identifiers is a response to the request. In a seventh aspect, alone or in combination with one or more of the first through sixth aspects, process 500 further includes receiving, prior to transmitting the request, another communication that indicates support for requests to receive the one or more network identifiers. In an eighth aspect, alone or in combination with one or more of the first through seventh aspects, the request is a first unauthenticated NAS message, a first authenticated NAS message, a first RRC message, or a system information request message, and the response is a second unauthenticated NAS message, a second authenticated NAS message, a second RRC message, or a SIB message.

In a ninth aspect, alone or in combination with one or more of the first through eighth aspects, a plurality of SNPNs are determined to permit access to subscribers of the network, and process 500 further includes selecting the SNPN with which the UE is to register from the plurality of SNPNs. In a tenth aspect, alone or in combination with one or more of the first through ninth aspects, the SNPN is associated with an SNPN identifier having a highest priority among a set of SNPN identifiers associated with the plurality of SNPNs.

In an eleventh aspect, alone or in combination with one or more of the first through tenth aspects, a first SNPN is determined to permit access to subscribers of a first network and a second SNPN is determined to permit access to subscribers of a second network, and process 500 further includes selecting the first SNPN or the second SNPN as the SNPN with which the UE is to register.

In a twelfth aspect, alone or in combination with one or more of the first through eleventh aspects, registering with the SNPN includes transmitting a subscription identifier associated with the network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving, from a network node, a broadcast communication indicating a plurality of standalone non-public networks (SNPNs), and indicating, per SNPN, of the plurality of SNPNs, whether the SNPN supports access from UEs not subscribed to the one or more SNPNs;

comparing an SNPN identifier of an SNPN to a set of SNPN identifiers, the set of SNPN identifiers comprising subscription permanent identifiers (SUPIs) corresponding to the plurality of SNPNs, wherein the set of SNPN identifiers is based at least in part on the broadcast communication;

determining, based at least in part on the comparing, that the SNPN permits access from UEs subscribed to a network different from the SNPN;

selecting the SNPN, from the plurality of SNPNs, based at least in part on the SNPN identifier of the SNPN having a highest priority among the set of SNPN identifiers corresponding to the plurality of SNPNs; and registering with the SNPN using subscription information of the network to which the UE is subscribed, based at least in part on determining that the SNPN permits access to subscribers of the network to which the UE is subscribed.

2. The method of claim 1, further comprising:

receiving a communication that includes the SNPN identifier of the SNPN.

3. The method of claim 2, further comprising:

receiving, from a network entity of the network, a configuration for the set of SNPN identifiers prior to determining whether the SNPN permits access to subscribers of the network.

4. The method of claim 1, further comprising:

receiving the broadcast communication, wherein the broadcast communication includes one or more network identifiers corresponding to respective networks of which subscribers are permitted access to the SNPN; and comparing an identifier of the network to the one or more network identifiers.

5. The method of claim 4, wherein the one or more network identifiers are shortened network identifiers that correspond to full network identifiers of the respective networks, and the identifier of the network is a shortened identifier that corresponds to a full network identifier of the network.

6. The method of claim 4, further comprising transmitting a request to receive the one or more network identifiers, wherein the broadcast communication that includes the one or more network identifiers is a response to the request.

7. The method of claim 6, further comprising receiving, prior to transmitting the request, another communication that indicates support for requests to receive the one or more network identifiers.

8. The method of claim 6, wherein the request is a first unauthenticated non-access stratum (NAS) message, a first authenticated NAS message, a first radio resource control (RRC) message, or a system information request message, and wherein the response is a second unauthenticated NAS message, a second authenticated NAS message, a second RRC message, or a system information block message.

9. The method of claim 1, wherein a first SNPN is determined to permit access to subscribers of a first network and a second SNPN is determined to permit access to subscribers of a second network, and wherein the method further comprises selecting the first SNPN or the second SNPN as the SNPN with which the UE is to register.

10. The method of claim 1, wherein registering with the SNPN comprises transmitting a subscription identifier associated with the network.

11. The method of claim 1, wherein selecting the SNPN from the one or more SNPNs further comprises: determining the SNPN identifier having the highest priority based at least in part on a configuration of a priority order for the set of SNPN identifiers.

12. The method of claim 3, further comprising: periodically receiving an updated configuration for the set of SNPN identifiers.

13. The method of claim 1, further comprising: receiving the broadcast communication from a base station, wherein the one or more SNPNs are associated with the base station.

14. The method of claim 1, wherein a cell is shared by the one or more SNPNs.

15. The method of claim 1, further comprising: receiving the broadcast communication in a system information block.

16. The method of claim 1, further comprising: entering a SNPN access mode.

17. A user equipment (UE) for wireless communication, comprising:
a transceiver;
one or more memories; and
one or more processors coupled to the transceiver and the one or more memories, wherein the one or more processors are configured to:
receive, from a network node via the transceiver, a broadcast communication indicating a plurality of standalone non-public networks (SNPNs), and indicating, per SNPN, of the plurality of SNPNs, whether the SNPN supports access from UEs not subscribed to the plurality of SNPNs;
compare an SNPN identifier of an SNPN to a set of SNPN identifiers, the set of SNPN identifiers comprising subscription permanent identifiers (SUPIs) corresponding to the plurality of SNPNs, wherein the set of SNPN identifiers is based at least in part on the broadcast communication;
determine, based at least in part on the comparing, that the SNPN permits access from UEs subscribed to a network different from the SNPN;
select the SNPN, from the plurality of SNPNs, based at least in part on the SNPN identifier of the SNPN having a highest priority among the set of SNPN identifiers corresponding to the plurality of SNPNs; and
register with the SNPN using subscription information of the network to which the UE is subscribed, based at least in part on determining that the SNPN permits access to subscribers of the network to which the UE is subscribed.

18. The UE of claim 17, wherein the one or more processors are further configured to:
receive a communication that includes the SNPN identifier of the SNPN.

19. The UE of claim 18, wherein the one or more processors are further configured to receive, from a network entity of the network, a configuration for the set of SNPN identifiers prior to determining whether the SNPN permits access to subscribers of the network.

20. The UE of claim 17, wherein the one or more processors are further configured to:
receive the broadcast communication, wherein the broadcast communication includes one or more network identifiers corresponding to respective networks of which subscribers are permitted access to the SNPN; and
compare an identifier of the network to the one or more network identifiers.

21. The UE of claim 20, wherein the one or more network identifiers are shortened network identifiers that correspond to full network identifiers of the respective networks, and the identifier of the network is a shortened identifier that corresponds to a full network identifier of the network.

22. The UE of claim 20, wherein the one or more processors are further configured to transmit a request to receive the one or more network identifiers, wherein the broadcast communication that includes the one or more network identifiers is a response to the request.

23. The UE of claim 22, wherein the one or more processors are further configured to receive, prior to transmitting the request, another communication that indicates support for requests to receive the one or more network identifiers.

24. The UE of claim 22, wherein the request is a first unauthenticated non-access stratum (NAS) message, a first authenticated NAS message, a first radio resource control (RRC) message, or a system information request message, and

wherein the response is a second unauthenticated NAS message, a second authenticated NAS message, a second RRC message, or a system information block message.

25. The UE of claim 17, wherein a first SNPN is determined to permit access to subscribers of a first network and a second SNPN is determined to permit access to subscribers of a second network, and wherein the one or more processors are further configured to select the first SNPN or the second SNPN as the SNPN with which the UE is to register.

26. The UE of claim 17, wherein the one or more processors, when registering with the SNPN, are configured to transmit a subscription identifier associated with the network.

27. The UE of claim 17, wherein the one or more processors, to select the SNPN from the one or more SNPNs, are further configured to:

determine the SNPN identifier having the highest priority based at least in part on a configuration of a priority order for the set of SNPN identifiers.

28. The UE of claim 19, wherein the one or more processors are further configured to:

periodically receive an updated configuration for the set of SNPN identifiers.

29. A non-transitory computer-readable medium storing a set of instructions for wireless communication, the set of instructions comprising:

one or more instructions that, when executed by one or more processors of a user equipment (UE), cause the UE to:

receive, from a network node, a broadcast communication indicating a plurality of standalone non-public networks (SNPNs), and indicating per SNPN, of the plurality of SNPNs, of whether the SNPN supports access from UEs not subscribed to the plurality of SNPNs;

compare an SNPN identifier of an SNPN to a set of SNPN identifiers, the set of SNPN identifiers comprising subscription permanent identifiers (SUPIs) corresponding to the plurality of SNPNs, wherein the set of SNPN identifiers is based at least in part on the broadcast communication;

determine, based at least in part on the comparing, that the SNPN permits access from UEs subscribed to a network different from the SNPN;

select the SNPN, from the plurality of SNPNs, based at least in part on the SNPN identifier of the SNPN having a highest priority among the set of SNPN identifiers corresponding to the plurality of SNPNs; and register with the SNPN using subscription information of the network to which the UE is subscribed, based at least in part on determining that the SNPN permits access to subscribers of the network to which the UE is subscribed.

30. An apparatus for wireless communication, comprising:

means for receiving, from a network node, a broadcast communication indicating a plurality of standalone non-public networks (SNPNs), and indicating, per SNPN, of the plurality of SNPNs, whether the SNPN supports access from UEs not subscribed to the plurality of SNPNs;

means for comparing an SNPN identifier of an SNPN to a set of SNPN identifiers, the set of SNPN identifiers comprising subscription permanent identifiers (SUPIs) corresponding to the plurality of SNPNs, wherein the set of SNPN identifiers is based at least in part on the broadcast communication;

means for determining, based at least in part on the comparing, that the SNPN permits access from UEs subscribed to a network different from the SNPN;

means for selecting the SNPN, from the plurality of SNPNs, based at least in part on the SNPN identifier of the SNPN having a highest priority among the set of SNPN identifiers corresponding to the plurality of SNPNs; and means for registering with the SNPN using subscription information of the network to which the apparatus is subscribed, based at least in part on determining that the SNPN permits access to subscribers of the network to which the apparatus is subscribed.

* * * * *